United States Patent

Karlsson et al.

Patent Number: 6,056,089
Date of Patent: May 2, 2000

[54] BRAKE DEVICE

[76] Inventors: Gerth Karlsson, Gånggriftsvägen 4,, 471 94, Kollekärr; Bengt Lennart Sundqvist, Ekbacken 5, 472 95, Varekil, both of Sweden

[21] Appl. No.: 09/077,702
[22] PCT Filed: Nov. 29, 1996
[86] PCT No.: PCT/SE96/01570
  § 371 Date: May 29, 1998
  § 102(e) Date: May 29, 1998
[87] PCT Pub. No.: WO97/20150
  PCT Pub. Date: Jun. 5, 1997

[51] Int. Cl.[7] .................... F16D 55/42; F16D 65/847
[52] U.S. Cl. .............. 188/71.6; 188/71.5; 188/264 A
[58] Field of Search ................ 188/18 A, 72.1, 188/72.5, 73.2, 71.5, 71.6, 264 A, 264 W, 366, 218 A; 192/88 A, 113.2, 113.22, 113.23

[56] References Cited

U.S. PATENT DOCUMENTS

| | | | |
|---|---|---|---|
| 2,729,298 | 1/1956 | Tourneau | 192/88 A |
| 2,823,770 | 2/1958 | Helvern | 188/71.5 |
| 3,047,097 | 7/1962 | Rockwell | 188/366 |
| 3,217,844 | 11/1965 | Nelson et al. | 192/113.23 |
| 3,862,678 | 1/1975 | Collins | 192/88 A |
| 3,899,049 | 8/1975 | Martin | 188/18 A |
| 3,931,871 | 1/1976 | Martin | 188/344 |
| 3,998,295 | 12/1976 | Martin | 188/71.7 |
| 4,266,638 | 5/1981 | Petersen et al. | 188/218 R |
| 4,358,000 | 11/1982 | Cumming | 188/71.5 |
| 4,456,099 | 6/1984 | Kawaguchi | 188/71.6 |
| 4,474,268 | 10/1984 | Daye | 188/71.5 |
| 4,609,076 | 9/1986 | Collins et al. | 188/71.5 |

Primary Examiner—Chris Schwartz
Attorney, Agent, or Firm—Dvorak & Orum

[57] ABSTRACT

The present invention relates to a brake device comprising a number of brake discs, brake pads and brake pad holders being arragned for mutual co-operation after axial operation by means of actuators for braking. The brake pads are being carried by the brake pad holders that are connected to a first frame member. Ring shaped brake discs are carried by a second frame member. Brake pad holders and brake discs ate axially displaceable journalled relative to each other. The two frame members are arranged to be braked relative to each other actuation of axially acting actuators. In order to provide efficient cooling of the parts that comprises the brake, there are a number of passages provided in the brake drum for leading air internally to the brake system when the drum and the wheel rotates in the direction of travel.

12 Claims, 5 Drawing Sheets

BRAKE DEVICE

BACKGROUND OF THE INVENTION

1. Field of the Invention

The present invention relates to a brake device comprising a number of brake discs, brake pads and brake pad holders being arranged for mutual co-operation after axial operation by means of actuators for braking, the brake pads being carried by the brake pad holders that are connected to a first frame member, ring shaped brake discs are carried by a second frame member, brake pad holders and brake discs being axially displaceable journalled relative to each other, wherein the two frame members are arranged to be braked relative to each other after actuation of axially acting actuators.

2. Description of the Related Art

Brakes for vehicles are usually categorised into drum brakes and disc brakes. Disc brakes are the most common brakes on passenger vehicles, due to their efficiency and flexibility, while deem brakes are more usually used on trucks and busses, thanks to their ability for large scaling, i.e. that the brakes may he designed with large dimensions, e.g. for the purpose of cooling and for good braking.

BRIEF SUMMARY OF THE INVENTION

The primary object of the present invention, is to provide a brake device according to the introductory part of claim 1, where the braking performance and the cooling performance are unchanged in spite of the small dimensions and the safe function of the brake. Said objects are achieved with a device in accordance with the present invention which is principally characterized in that there are a number of passages/openings provided in the frame member/brake housing of the brake for leading air internally to the brake and thereby providing air cooling of comprised brake parts.

The invention will in the following be further described as a number of preferred embodiments with reference to the accompanying drawings, in which:

DETAILED DESCRIPTION OF THE INVENTION

Figure 1:
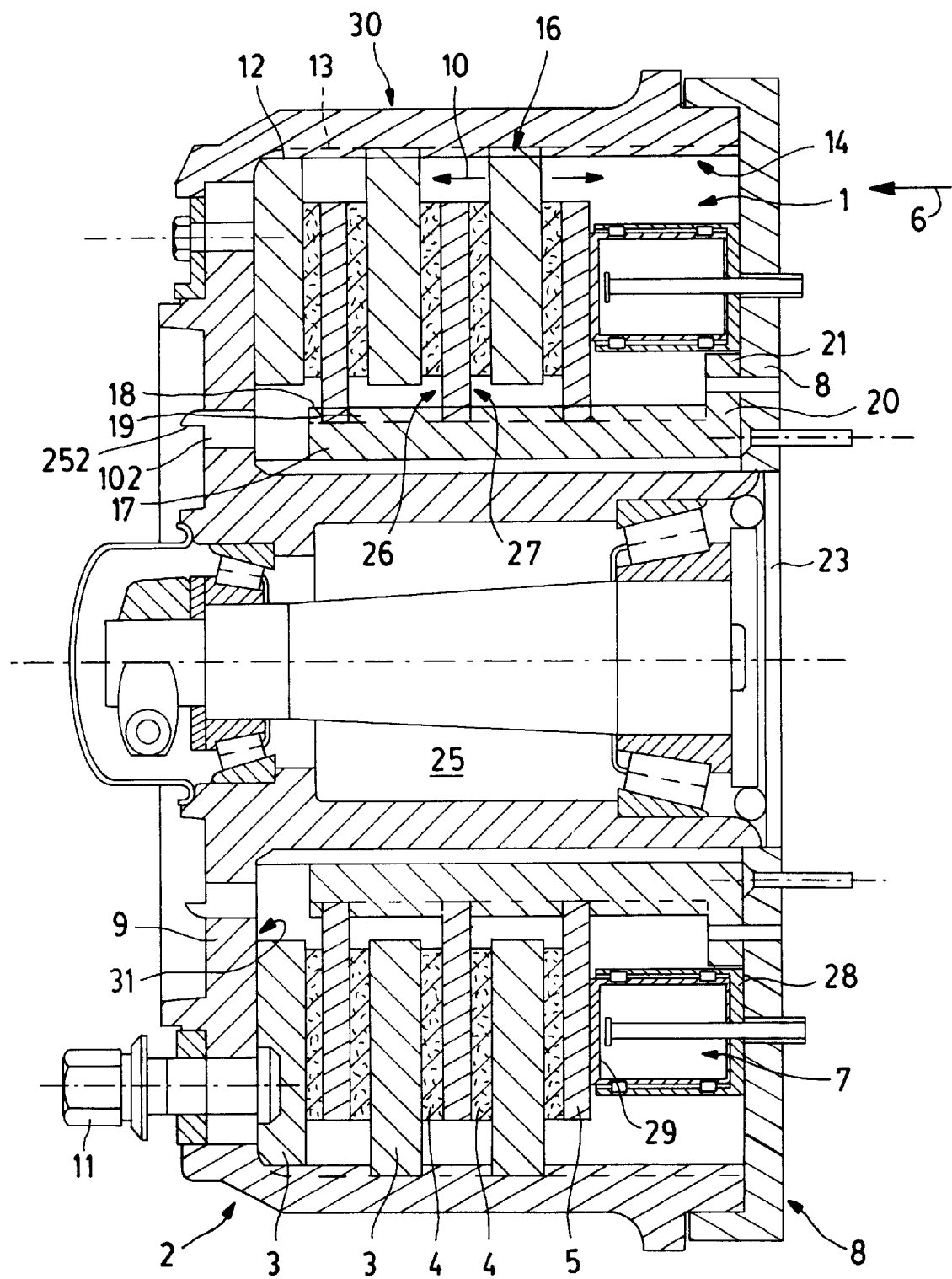
FIG. 1 is a cross sectional view of a brake in an active braking condition.
Figure 2:
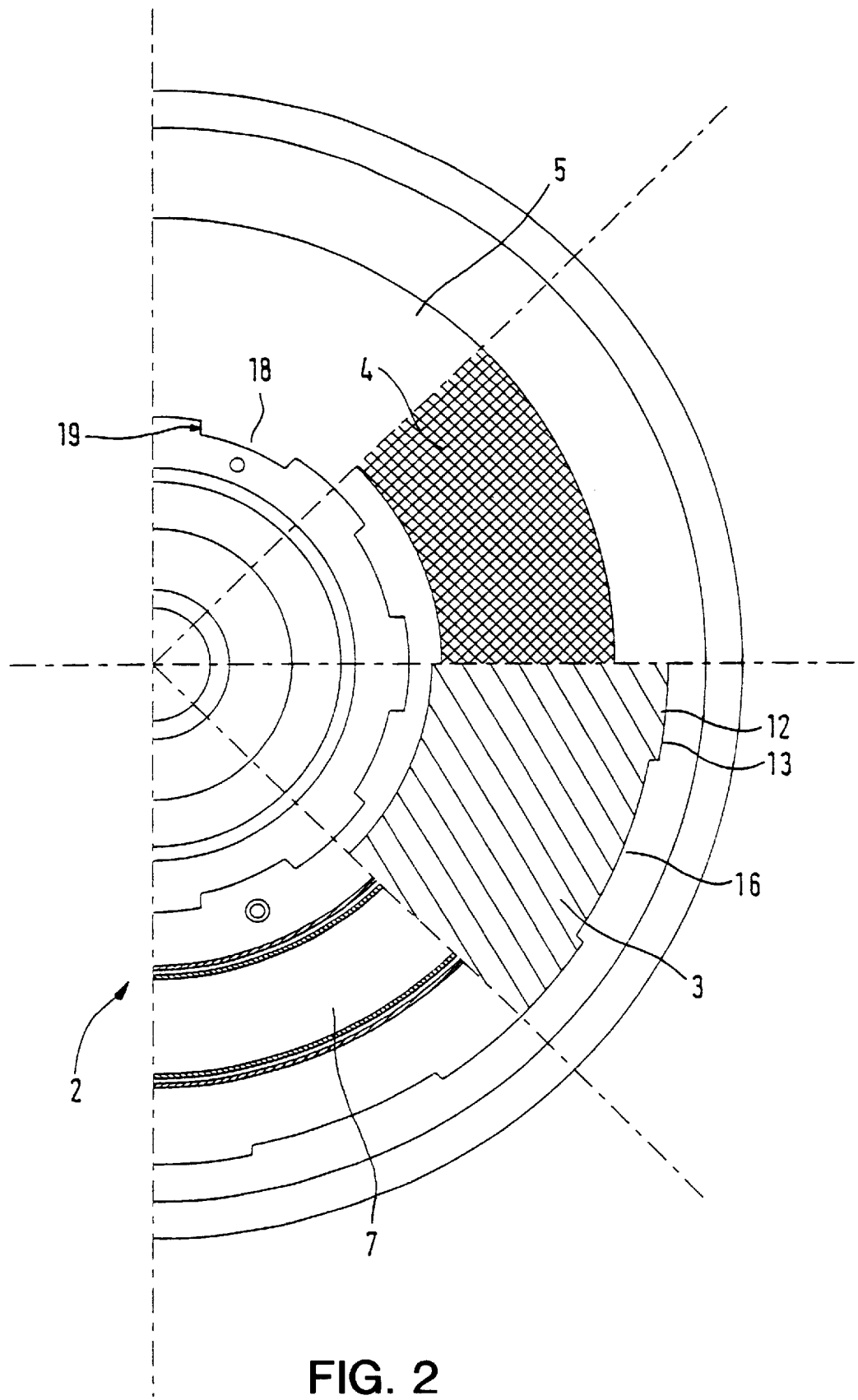
FIG. 2 shows in a plan view the brake device with different parts in section.

A device 1 for a brake 2 which is primarily intended for use with vehicles like busses, trucks, lorries etc., but may also be used for other purposes, and comprising a number of brake discs 3, brake pads 4, and brake pad holders 5 that are adapted to co-operate with each other after axial 6 actuation of the brake 2 by means of actuator means 7 for braking, with said comprised parts being arranged in a special way.

To be precise, the brake pads 4 are carried by the brake pad holder 5, which is connected to a first frame member 8.

Moreover, ring shaped brake discs 3 are carried by a second frame member 9. In order to allow for sell adjustment of the active brake parts 3; 4, 5, said brake pad holders 5 alone with the there upon carried brake pads 4, and brake discs 3 are axially displaceable journalled 10 relative to each other. For this object, the two frame members 8, 9 are adapted to be braked relative to each other after actuation of axially acting actuators 7.

One of said two frame members 8, 9 is formed by a vehicle chassis 8, and the second frame member is formed by a rotatable drum 9 onto which for example a vehicle wheel is arranged to be attached efficiently and secure by means or wheel bolts 11 according to art and not disclosed in detail. The brake discs 3, the number of which may vary from a single up to a large number depending upon space and braking performance, are preferably connected to the drum 9. They are for this object received by the drum 9 with their respective outer circumference part 12 of the brake discs 3 in a number of axially running grooves 13.

Preferably, there are several grooves 13 in the form of splines distributed correspondingly along the external mantle surface 16 of the brake discs.

Moreover, there are disc shaped brake pad holders 5 mounted on a hub shaped centre part 17 upon the respective frame member 8 non-rotatable connected relative to said centre part 17. Said brake pad holders 5 are ring shaped and are axially displaceable journalled with internal splines 18 received in external splines 19 on the centre part 17, in the axial direction 10.

Said hub shaped centre part 17 is formed by a cylinder, the end part 20 of which is rigidly connected by means of a flange 21 to an inner, non-rotatable frame member 8A centre opening 23 of which a bearing 24 for the frame members 8, 9 reaches and which bearing is housed in a central cavity 25.

Preferably, brake pads 4 are shaped as rings or are composed by a number of segments of brake pad material together forming a ring. Preferably, said brake pads 4 are made of an asbestos free material that is carried mounted at each side 26, 27 of the respective brake pad holder 5.

The brake pad holder 5 being located nearest the actuator means 7 lacks brake pad material along the flat side 27 which is turned towards it by reasons that will be easily understood.

Said actuator means 7 comprise at least one jack which is adapted to operate by means of a suitable fluid, preferably pneumatic. For example, there may be arranged a plurality of equally distributed jacks around the circumference of the brake 2.

In the disclosed embodiment, the jack is formed by a single ring shaped piston 7, one end 28 of which is acting against a frame member 8, and which is acting with the other end 29 against the formed aggregate 30 of brake pads 4, brake pad holders 5 and brake discs 3 in order to provide compression in the force direction 6 against an opposed frame member 9, namely the internal gable wall 31 of the drum.

A correspondingly designed brake 2 is arranged to function efficiently. As an example may be mentioned that the operative braking surface for the brake pads 4 is doubled in comparison with conventional drum brakes of a corresponding size, which ought to explain the efficiency of the present brake which is about three times better.

The assembly of the parts that comprise the brake 2 is also single to execute.

Figure 3:
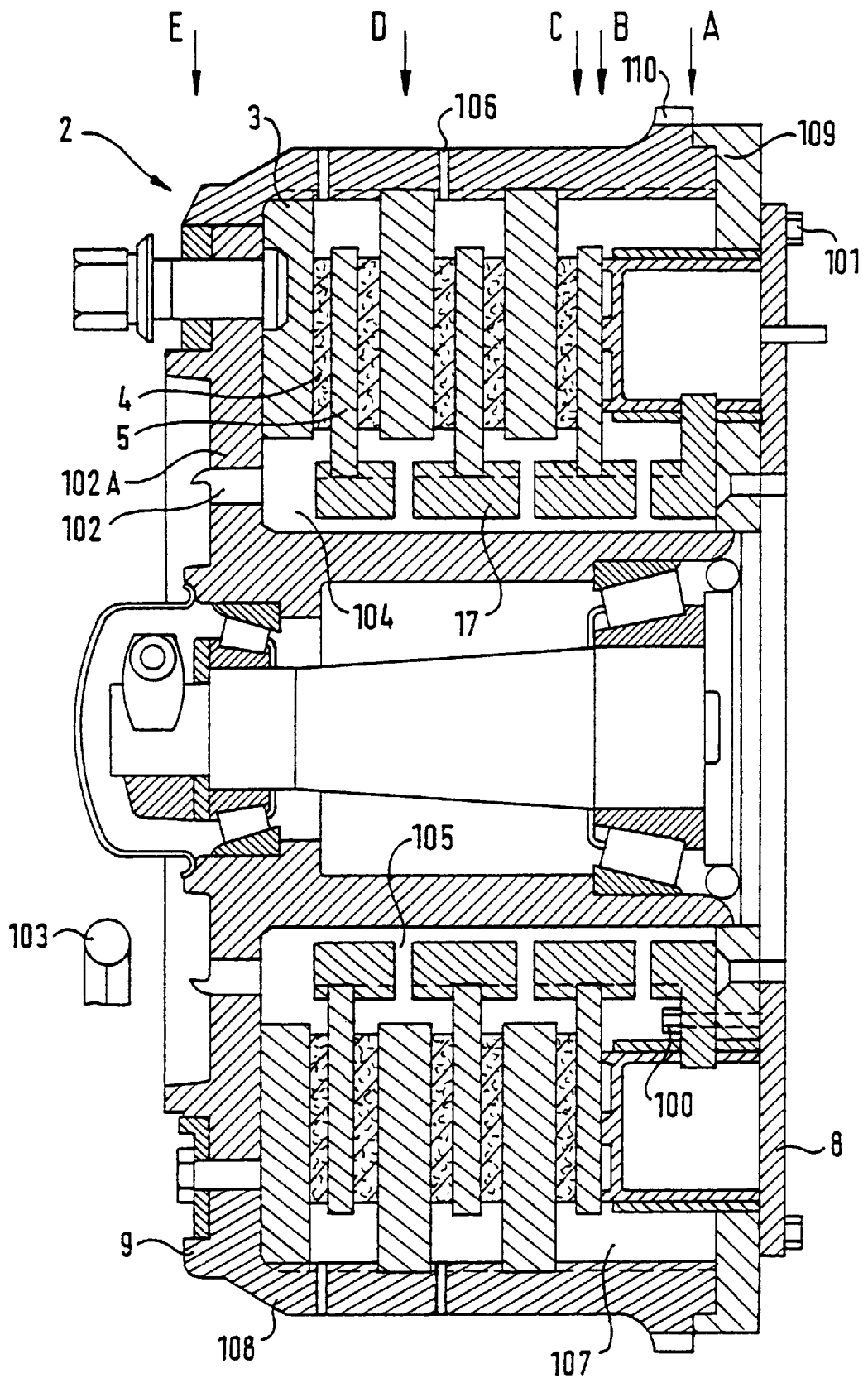
FIG. 3 shows another embodiment of a brake with cooling, shown in cross section.
Figure 4:
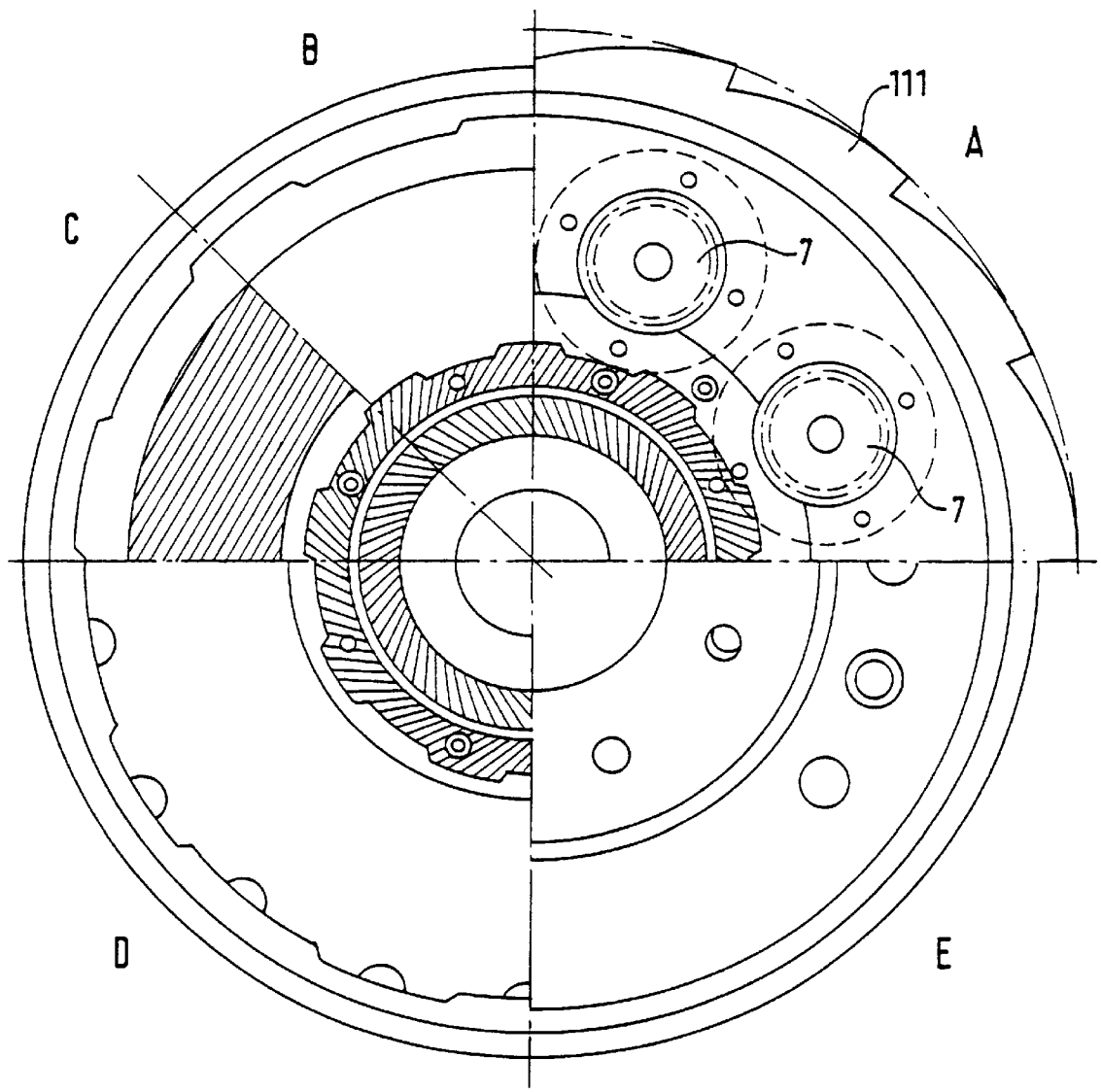
FIG. 4 shows in a plan view said brake in section along different section lines in FIG. 3.

In the brake 2 which is shown in FIGS. 3–4 there are three ring shaped brake discs 3 which are ventilated and which also may move axially, carried by the enveloping brake drum 9. There are three disc shaped brake pad holders 5, with brake cads 4 for example attached by gluing along at least one of the flat sides. Said brake pad holders 5 are also axially displaceable journalled independent from each other on a tube shaped centre part 17 which is attached by means of screws 100 in the frame member which functions as a brake shield 8.

The disclosed embodiment comprises a plurality of pistons 7 that are equally distributed around the circumference and are attached to the brake shield 8 by means of screws 101. The function of these actuator means 7 is also to compress the brake discs 3 and the pads 4 when for example the pneumatic pressure increases for providing braking. Since the brake 2 is self adjusting, breaking will be provided instantly without any substantial delay.

In order to provide an efficient cooling of the parts that comprises the brake there are a plurality of passages 102 in the front side 102A of the brake drum and there is attached a pre-shaped bent metal sheet or piece of plastic 103. This piece 103 is turned or manufactured in some other way with the desired angle depending upon which side of the vehicle that the brake 2 is mounted for pressing air into the inside 104 of the brake system when the brake drum and the wheel is rotating in the direction of travel. In said centre part 17, which retains the brake pad holders 5 and the brake pads 4, there are arranged preferably radial through channels or holes 105 enabling for entering air to pass through the ventilated brake discs 3, for example via radial channels 107 and flow upward and out to the environment via further holes 106 which are arranged in the surrounding mantle shaped outer shell 108 of the drum.

Dirt and other undesirable matter is pressed out from the brake 2 by the action of the centrifugal force.

A ring 110 may be pressed onto the rear edge 109 of the brake drum 2 which ring is provided with irregularities 111 for creating a vacuum between the brake drum 9 and the wheel rim, thereby providing a more efficient air cooling.

For example, two of said pistons 7 may be arranged to be actuated by a so called maxibrake, for providing a prior art hand brake.

Figure 5:
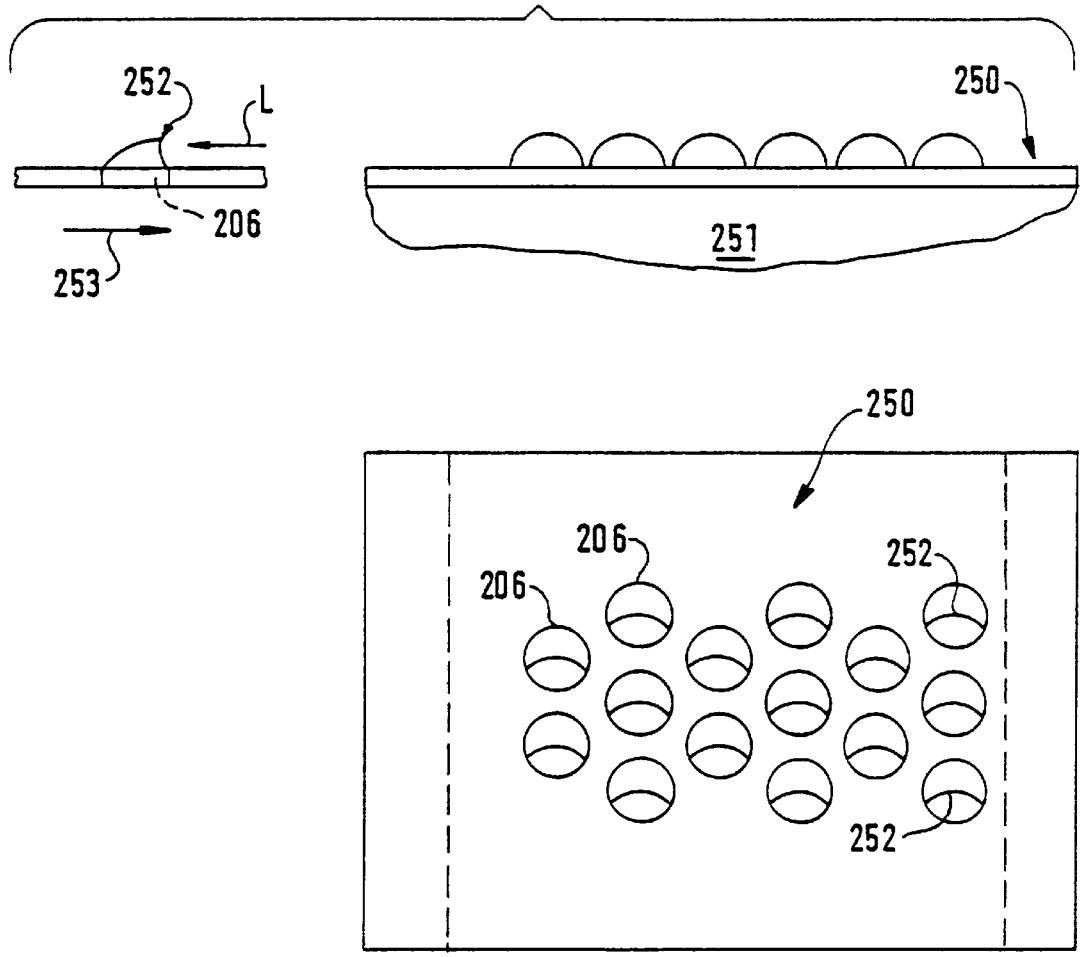
FIG. 5 shows different views of ventilation openings for a brake housing.

The embodiment shown in FIG. 5 clearly illustrates an example of how a plurality of ventilation openings 206 are arranged distributed along the brake housing 250 in which the movable parts of the brake are housed protected. Preferably, said ventilation openings 206 are manufactured by punching from the inside 251 of the brake housing. By this, a baffle wall 252 or an edge is formed at the opening 206 which is directed wit h its opening turned toward the direction of rotation 253 of the brake housing 250. When driving the vehicle and the wheels, the brake housing 250 of each wheel is rotating and air L is pressed in through the formed opening 206 by means of said baffle wall or scoop shaped means 252 for controlling air flow, wherein an efficient flow of air to the insides 251 of the brake is achieved.

The invention is not limited to the above described and in the drawings shown embodiments of the brake device but may be varied within the scope of the claims without leaving the scope of the invention.

We claim:

1. A brake device including an inside cavity comprising:
 a rotatable brake drum;
 at least one brake disc connected to said rotatable drum;
 at least one brake pad holder coaxial with said at least one brake disc;
 at least one brake pad carried by said at least one brake pad holder;
 a brake shield connected to said at least one brake pad holder;
 an actuator contacting said at least one brake pad holder,
 said at least one brake disc, brake pad holder and brake pad are axially aligned for mutual cooperation upon axial actuation of said actuator,
 said rotatable brake drum includes a front side, a plurality of passages cut through and distributed along said front side of said brake drum, and a baffle wall protruding from each passage for pressing air into each passage and into the inside cavity of the brake device when said brake drum rotates.

2. The brake device according to claim 1, wherein said brake shield is a vehicle chassis.

3. The brake device according to claim 1, wherein said at least one brake disc includes an external mantle surface and splines distributed along said mantle surface, and said brake drum includes axial grooves distributed along an internal envelope surface of said brake drum wherein said splines of said at least one brake disc are received into said axial grooves of said brake drum.

4. The brake device according to claim 1, further comprising a hub-shaped central part non-rotatably connected to said brake shield wherein said at least one brake pad holder is ring-shaped and mounted on said hub-shaped central part.

5. The brake device according to claim 4, further comprising internal splines on an internal surface of said at least one brake pad holder, received into external splines on an external surface of said hub-shaped central part.

6. The brake device according to claim 4, wherein said hub-shaped central part is formed from a cylinder and further includes an end part comprised of a flange connected to said brake shield.

7. The brake device according to claim 1, wherein said at least one brake pad is ring-shaped and formed by several layers of an asbestos-free material pressed together.

8. The brake device according to claim 1, further comprising a plurality of brake pad holders, brake discs and brake pads.

9. The brake device according to claim 8, wherein said brake pad holders each comprise first and second flat sides, and at least one brake pad holder carries a brake pad on both first and second flat sides.

10. The brake device according to claim 1, wherein said actuator includes at least one fluid operated jack.

11. The brake device according to claim 10, wherein said jack is a ring-shaped piston including a first end, and a second end wherein said first end acts against said brake shield and said second end acts against said at lease one brake pad holder, brake pad and brake disc providing a compression force against said rotatable brake drum.

12. The brake device according to claim 1, further comprising a pre-shaped bent metal sheet inserted into each passage of said brake drum, wherein said pre-shaped bent metal forms the baffle wall which protrudes from each passage and presses air into each passage.

* * * * *

UNITED STATES PATENT AND TRADEMARK OFFICE
CERTIFICATE OF CORRECTION

PATENT NO. : 6,056,089
DATED : May 2, 2000
INVENTOR(S) : Gerth Karlsson and Bengt Lennart SUNDQUVIST It is certified that error appears in the above-identified patent and that said Letters Patent is hereby corrected as shown below:

On the title page, add
Item [30] Foreign Application Priority
November 29, 1995 [SE] Sweden... 95 04286-7

Signed and Sealed this

Twenty-seventh Day of February, 2001

Attest:

NICHOLAS P. GODICI

Attesting Officer

Acting Director of the United States Patent and Trademark Office